(12) United States Patent
Murphy

(10) Patent No.: US 6,952,445 B2
(45) Date of Patent: Oct. 4, 2005

(54) SYMBOL CONSTELLATIONS HAVING SECOND-ORDER STATISTICS WITH CYCLOSTATIONARY PHASE

(76) Inventor: Charles D. Murphy, 1816 W. Wilson Ave. # 3, Chicago, IL (US) 60640

( * ) Notice: Subject to any disclaimer, the term of this patent is extended or adjusted under 35 U.S.C. 154(b) by 833 days.

(21) Appl. No.: 09/928,897

(22) Filed: Aug. 14, 2001

(65) Prior Publication Data

US 2003/0035492 A1 Feb. 20, 2003

(51) Int. Cl.[7] .................................................. H04L 27/00
(52) U.S. Cl. ........................ 375/232; 375/259; 375/295
(58) Field of Search ................................. 375/295, 229, 375/230, 232, 259

(56) References Cited

U.S. PATENT DOCUMENTS 4,922,506 A     5/1990   McCallister et al.
6,463,099 B1 * 10/2002   Cao et al. ..................... 375/232

OTHER PUBLICATIONS

E. Serpedin & G.B. Giannakis, "Blind Channel Identification and Equalization with Modulation–Induced Cyclostationarity" IEEE Trans. on Signal Processing, vol. 46, No. 7, pp. 1930–1944.
G.B. Giannakis, "Filterbanks for Blind Channel Identification and Equalization," IEEE Signal Processing Letters, vol. 4, No. 6, pp. 184–187, Jun. 1997.
MK Tsatsanis & GB Giannakis, "Transmitter Induced Cyclostationarity for Blind Channel Equalization," IEEE Trans. on Signal Processing, vol. 45, No. 7, pp1785–1799.

D. Hatzinakos and CL Nikias, "Blind Equalization Based on Higher–Order Statistics (H.O.S.)," in Blind Deconvolution, ed. S. Haykin, Englewood Cliffs: PTR Prentice Hall, 1994.
L.Tong, G. Xu, and T. Kailath, "Blind Identification and Equalization Based on Second–Order Statistics: A Time Domain Approach," IEEE Trans. on Information Theory, vol. 40, No. 2, pp. 340–349, Mar. 1994.
CB Papadias and DTM Slock, "Fractionally Spaced Equalization of Linear Polyphase Channels and Related Blind Techniques based on Multichannel Linear Prediction," IEEE Trans. on Signal Processing, vol. 47, No. 3, pp. 641–654, Mar. 1999.
A. Furuskar, S. Mazur, F. Muller, and H. Olofsson, "EDGE: Enhanced Data Rated for GSM and TDMA/136 Evolution," IEEE Personal Communications, vol. 6, No. 3, pp. 56–66, Jun. 1999.

(Continued)

Primary Examiner—Jay K. Patel
Assistant Examiner—David B. Lugo

(57) ABSTRACT

The present invention is a machine or method used in digital communications. Symbols are selected in periodic fashion from at least two different symbol constellations. At least one of the symbol constellations has a non-conjugated second moment not equal to zero. The non-conjugated second moment is a second-order statistic. Symbol selection leads to second-order input statistics having cyclostationary phase, and thus to second-order output statistics having cyclostationary phase. These statistics can be used for low-complexity identification and equalization of both linear and nonlinear channels. The invention allows for low-complexity identification and equalization of linear channels and of nonlinear channels without requiring constant-modulus constellations.

9 Claims, 7 Drawing Sheets

OTHER PUBLICATIONS

D. Boss, K.D. Kammeyer, and T. P. Petermann, "Is Blind Channel Estimation Feasible in Mobile Communication Systems? A Study Based on GSM," IEEE Journal on Selected Areas in Communications, vol. 16, No. 8, pp. 1479–1492, Oct. 1998.

J.G. Proakis, "Digital Communications," New York: McGraw Hill, 1995.

R.L. Freeman, "Telecommunications Transmission Handbook," 4th edition, New York: John Wiley & Sons, 1998.

W.A. Gardner (editor) "Cyclostationarity in Communications and Signal Processing," New York: IEEE Press, 1994.

JS Bendat, "Nonlinear System Analysis and Identification from Random Data", New York: John Wiley & Sons, 1990.

Y. Sato, "A Method of Self–Recovering Equalization for Multilevel Amplitude–Modulation Systems," IEEE Trans. on Communications, vol. COM–23, pp. 679–682, Jun. 1975.

D.N. Godard, "Self–Recovering Equalization and Carrier Tracking in Two Dimensional Data Communication Systems," IEEE Trans. on Communications, vol. COM28, pp. 1867–1875, Nov. 1980.

JR Treichler & BG Agee, "A New Approach to Multipath Correction of Constant–Modulus Signals," IEEE Trans. on Acoustics, Speech, & Signal Processing, vol. 31, No. 2, pp. 459–471, Apr. 1983.

J. Gomes & V. Barroso, "Using an RBF Network for Blind Equalization: Design and Performance Evaluation," Proceedings of ICASSP 1997, pp. 3285–3288.

S.Theodoridis, CFN Cowan, CP Callender, and CMS See, "Schemes for Equalisation of Communication Channels with Nonlinear Impairments," IEE Proceedings on Communications, vol. 142, No. 3, pp. 165–171, Jun. 1995.

A.M. Saleh, "Frequency Independent and Frequency Dependent Nonlinear Models of TWT Amplifiers," IEEE Trans. on Communications, vol. COM–29, pp. 1715–1720, Nov. 1981.

D. Dardari, V. Tralli, and A. Vaccari, "A Novel Low Complexity Technique to Reduce Non–linear Distortion Effects in OFDM Systems," Proceedings of IEEE PIMRC Sep. 1998.

* cited by examiner

SYMBOL CONSTELLATIONS HAVING SECOND-ORDER STATISTICS WITH CYCLOSTATIONARY PHASE

BACKGROUND

1. Field of Invention

The invention relates to digital communications channel identification and equalization using measured second-order statistics of channel inputs when certain second-order statistics of channel inputs have periodically varying phase.

2. Description of Prior Art

In digital communications, the distortions caused by the physical channel between a transmitter and a receiver are incorporated into mathematical channel model. Possible distortions may include the well-known phenomenon of linear inter-symbol interference as well as additive noise and nonlinearity. Channel identification is the process of determining numeric values for the parameters of a channel model. These values allow the receiver to compensate for the channel distortions, a process known as equalization.

For general discussion of digital communications and equalization, see "Digital Communications" by J. G. Proakis (third edition, McGraw-Hill, 1995) and "Telecommunications Transmission Handbook" by R. L. Freeman (fourth edition, John Wiley & Sons, 1998).

Channel identification and equalization may rely on sending one or more known training symbols through the channel from the transmitter to the receiver. This training mode is used, for instance, in setting up a telephone modem connection. The modems at either end of the channel take a few seconds at the beginning of the connection to send training symbols and estimate equalizer parameters. The training symbols may be re-sent if one of the modems determines that the channel parameters have changed and that the parameter estimates are no longer accurate.

In another example of training-mode equalization, a digital mobile phone system using a standard such as GSM, EDGE, or TDMA sends bursts of data in packets. Training symbols occupy the middle of each packet. Because the channel parameters change from packet to packet, the receiver uses the training symbols to estimate the parameters for each packet separately.

Recent papers on equalization of digital mobile phone channels include "EDGE: Enhanced Data Rates for GSM and TDMA/136 Evolution" by A. Furuskar, S. Mazur, F. Muller, and H. Olofsson (IEEE Personal Communications, Vol. 6, No. 3, pp. 56–66, June 1999) and "Is Blind Channel Estimation Feasible in Mobile Communication Systems? A Study Based on GSM" by D. Boss, K.-D. Kammeyer, and T. Petermann (IEEE Journal on Selected Areas in Communications, Vol. 16, No. 8, pp. 1479–1492, October 1998).

The main advantages of training-based channel identification and equalization are that techniques for estimating the channel parameters can have low computational complexity and can produce parameter estimates relatively quickly. The main disadvantage of training-based channel identification and equalization is that some symbols that could be used to send data must instead be used for training symbols.

In some circumstances, few or no training symbols are available. A receiver may then rely on statistical techniques for channel parameter estimation. These techniques use knowledge of channel input statistics and measurements of channel output statistics. When there are no training symbols, channel identification and equalization are said to be "blind". When there are a few training symbols, channel identification and equalization are said to be "semiblind".

The main advantage of blind channel identification over training-based channel identification is that the transmitter does not have to reduce the data rate. The main drawbacks of blind channel identification are that the statistical signal processing techniques used may have a very high computational complexity and may not guarantee correct identification of every channel in a timely manner.

There are a wide variety of blind channel identification and equalization algorithms for channels modeled as having linear inter-symbol interference followed by independent additive noise. Blind methods for these linear channels may be broadly characterized as those based on higher-order statistics (HOS) and those based on second-order statistics (SOS).

The higher-order statistics in an HOS blind technique can be either explicit, such as in the Tricepstrum Equalization Algorithm, or implicit, such as in the Sato Algorithm and the Godard or Constant-Modulus Algorithm. HOS techniques with low computational complexity tend to have poor convergence properties. HOS techniques with good convergence properties tend to have very high computational complexity. Many HOS techniques are slow to converge and cannot identify all possible practical channels.

The Tricepstrum Equalization Algorithm is discussed in "Blind Equalization Based on Higher-Order Statistics (H.O.S.)" by D. Hatzinakos and C. L. Nikias (in "Blind Deconvolution", S. Haykin editor, PTR Prentice Hall, 1994). The Sato Algorithm is discussed in "A Method of Recovering Equalization for Multilevel Amplitude-Modulation Systems" by Y. Sato (IEEE Transactions on Communications, Vol. COM-23, pp. 679–682, June 1975). The Godard algorithm, which is also known as the Constant Modulus Algorithm, appears in "Self-Recovering Equalization and Carrier Tracking in Two-Dimensional Data Communication Systems" by D. N. Godard (IEEE Transactions on Communications, Vol. COM-28, pp. 1867–1875, November 1980) and in "A New Approach to Multipath Correction of Constant-Modulus Signals" by J. R. Treichler and B. G. Agee (IEEE Trans. on Acoustics, Speech, and Signal Processing, Vol. 31, No. 2, pp. 459–471, April 1983).

SOS techniques include those based on fractional sampling and those based on baud-sampled cyclostationary statistics.

Fractional sampling involves generating more than one channel output measurement for each transmitted symbol. For these fractional samples to provide useful information, the system must use extra transmission bandwidth.

Prior art discussions of fractional sampling for blind equalization appear in "Blind Identification and Equalization Based on Second-Order Statistics: A Time Domain Approach" by L. Tong, G. Xu, and T. Kailath (IEEE Transactions on Information Theory, Vol. 40, No. 2, pp. 340–349, March 1994) and in "Fractionally Spaced Equalization of Linear Polyphase Channels and Related Blind Techniques based on Multichannel Linear Prediction" by C. B. Papadias and D. T. M. Slock (IEEE Transactions on Signal Processing, Vol. 47, No. 3, pp. 641–654, March 1999) among others.

Advantages of SOS techniques based on fractional sampling include relatively low-complexity processing and fast convergence. Disadvantages are the inability to identify all practical linear channels, the need for extra transmission bandwidth, and processing at a sampling rate greater than the baud rate.

Baud-rate sampling involves generating one channel output measurement for each transmitted symbol. Because stationary baud-sampled SOS do not allow blind identification of channels not known either to be minimum-phase or to be maximum phase, the statistics must be cyclostationary. A cyclostationary statistic is one that changes in a periodic manner. The book "Cyclostationarity in Communications and Signal Processing" edited by W. A. Gardner (IEEE Press, 1994) has an extensive discussion of cyclostationary statistics.

Recent work on baud-sampled cyclostationary second-order statistics for blind equalization appears in the papers "Blind Channel Identification and Equalization with Modulation-Induced Cyclostationarity" by E. Serpedin and G. B. Giannakis (IEEE Transactions on Signal Processing, Vol. 46, No. 7, pp. 1930–1944, July 1998), "Filterbanks for Blind Channel Identification and Equalization" by G. B. Giannakis (IEEE Signal Processing Letters, Vol. 4, No. 6, pp. 184–187, June 1997), and "Transmitter Induced Cyclostationarity for Blind Channel Equalization" by M. K. Tsatsanis (IEEE Transactions on Signal Processing, Vol. 45, No. 7, pp. 1785–1794, July 1997).

All three of these papers focus on creating sequences with cyclostationary conjugated second-order moments. U.S. Pat. No 4,922,506 issued to R. D. McCallister and D. D. Shearer in 1990 proposes very broadly the similar idea of using cyclostationary properties of the cross-spectrum, which in sampled form is identical to use of conjugated second-order moments.

Advantages of SOS techniques based on baud-sampled cyclostationary statistics include low-complexity processing at the baud rate, fast convergence, and the ability to identify all practical linear channels. Disadvantages of many SOS techniques based on baud-sampled cyclostationary statistics include the need for extra transmitted power or extra transmitted bandwidth to produce the required cyclostationary properties.

For channels with nonlinearity, linear inter-symbol interference, and noise there are relatively few blind channel identification and equalization techniques. Most of these are based on higher-order statistics, and suffer from the disadvantages of HOS. HOS methods for nonlinear channels typically have much higher computational complexity than HOS methods for linear channels, whether blind or training-based.

Examples of nonlinear channel equalization appear in "Schemes for Equalisation of Communication Channels with Nonlinear Impairments" by S. Theodoridis, C. F. N. Cowan, C. P. Callender, and C. M. S. See (IEE Proceedings on Communications, Vol. 142, No. 3, pp. 165–171, June 1995) and in "A Novel Low Complexity Technique to Reduce Non-linear Distortion Effects in OFDM Systems" by D. Dardari, V. Tralli, and A. Vaccari (Proceedings of IEEE PIMRC '98, Boston, September 1998). An example of blind equalization using a nonlinear equalizer appears in "Using an RBF Network for Blind Equalization: Design and Performance Evaluation" by J. Gomes and V. Barroso (Proceedings of ICASSP 1997, pp. 3285–3288, 1997).

A common source of nonlinearity is a power amplifier at the transmitter that has a nonlinear transfer function. One example is in the paper by Dardari, Tralli, and Vaccari. Another appears in "Frequency Independent and Frequency Dependent Nonlinear Models of TWT Amplifiers" by A. M. Saleh (IEEE Transactions on Communications, Vol. COM-29, pp. 1715–1720, November 1981). For small input amplitudes, the output is highly linear, while for large input amplitudes, the output may be highly nonlinear. The nonlinearity may affect the amplitude, the phase, or both the amplitude and phase of the transmitted symbol.

One way to avoid the nonlinearity is to restrict the transmitter to using small input levels, a technique known as "back-off". A disadvantage of back-off is that the power amplifier may then operate at a lower level of efficiency, with less useful, transmitted power relative to the power dissipated as heat. This can be a particular problem when the power source is limited, such as a mobile phone battery or a satellite solar panel.

Another way to combat the effects of certain types of power-amplifier nonlinearity is to use a symbol constellation having symbols that are all the same amplitude. If the nonlinearity is a function of the input amplitude, and all the symbols have the same amplitude, then the overall effect of the nonlinearity is a linear gain applied to the transmitted symbols. Using such a constant-modulus constellation, however, may limit the bandwidth efficiency. Bandwidth efficiency measures the number of data bits transmitted per symbol when transmitted power is limited. A constant modulus constellation may have symbols that are closer together than a non-constant modulus constellation with the same power and number of symbols. Fewer symbols must be used in order to meet minimum symbol separation requirements.

A third solution to channel identification and equalization of nonlinear channels is to use training symbols. This eases the difficulties of computational complexity and convergence, but at the cost of reduced data rates.

The disadvantages of existing methods for channel identification and equalization are several:

(a) Training-based channel identification and equalization techniques require that data rates be decreased in order to accommodate transmission of known training symbols.

(b) For linear channels, blind channel identification techniques based on higher-order statistics may have high computational complexity. They may also be slow to converge and may not be able to identify all commonly-occurring channels.

(c) For linear channels, blind channel identification techniques based on second-order statistics using fractional sampling require extra signal bandwidth, and cannot identify all commonly-occurring channels.

(d) For linear channels, blind channel identification techniques based on baud-sampled second-order statistics that are cyclostationary in amplitude require extra average transmitted power or extra signal bandwidth to provide useful cyclostationary properties.

(e) For nonlinear channels, blind channel identification algorithms based on higher-order statistics may have very high computational complexity. They may be slow to converge and may not be able to identify all commonly-occurring channels.

(f) For nonlinear channels, methods of reducing the effects of nonlinear distortion such as back-off or constant-modulus constellations can have undesirable effects on power efficiency or bandwidth efficiency.

SUMMARY

The present invention enables channel identification and equalization of linear and nonlinear channels using second-order statistics. Two or more symbol constellations with different input statistics are used periodically, resulting in second-order statistics that have cyclostationary phase.

Objects and Objectives

Accordingly, several objects and advantages of the present invention are:

(a) to enable low-complexity blind or semi-blind channel identification and equalization using baud-sampled second-order statistics with cyclostationary phase;

(b) to reduce or eliminate the need for extra average transmitted power and extra signal bandwidth;

(c) to reduce or eliminate the need for training symbols in channel identification and equalization;

(d) to enable low-complexity blind or semi-blind channel identification and equalization methods for channels having both linear and nonlinear parameters, such as underwater acoustic channels, satellites with traveling wave tube amplifiers, and systems using high-power solid state amplifiers;

(e) to enable low-complexity blind or semi-blind channel identification and equalization in systems that have already been constructed, without requiring replacement of hardware components, such as satellite communications systems or terrestrial wireless communications systems;

Further objects and advantages of the invention will become apparent from a consideration of the drawings and ensuing description.

DRAWING FIGURES

In the drawings, closely related figures have the same number but different alphabetic suffixes.

Figure 1A:
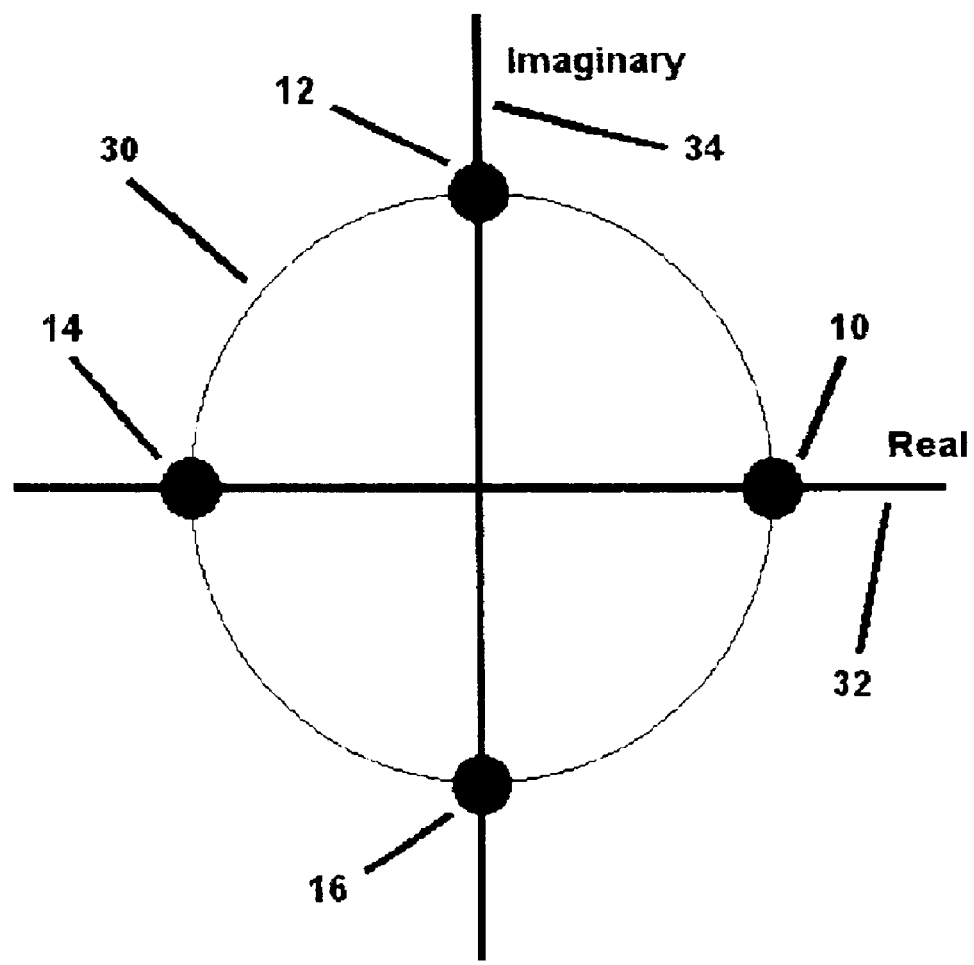
FIG. 1A shows a constellation having four symbols with the same amplitude but different phase.

REFERENCE NUMERALS IN DRAWINGS 10 a symbol 1+0j
12 a symbol 0+j
14 a symbol −1+0j
16 a symbol 0−j
20 a symbol sqrt(⅔)+0j
22 a symbol 0+1/sqrt(2)j
24 a symbol −sqrt(⅔)+0j
26 a symbol 0−1/sqrt(2)j
30 a reference circle of unit amplitude
32 a positive real axis
34 a positive imaginary axis
40 a non-conjugated second moment at index n
42 a non-conjugated second moment at index n+1
44 a non-conjugated second moment at index n+2
46 a non-conjugated second moment at index n+3
50 a conjugated second moment at index n
52 a conjugated second moment at index n+1
54 a conjugated second moment at index n+2
56 a conjugated second moment at index n+3
60 a channel input x[n]
62 a channel output y[n]
64 a linear channel component
66 a memoryless nonlinear channel component
68 a noise component w[n]
70 a linear channel coefficient h[k]
72 a nonlinear channel transfer function g(.)
74 a first intermediate channel term
76 a second intermediate channel term
78 a third intermediate channel term

DESCRIPTION

Figure 1B:
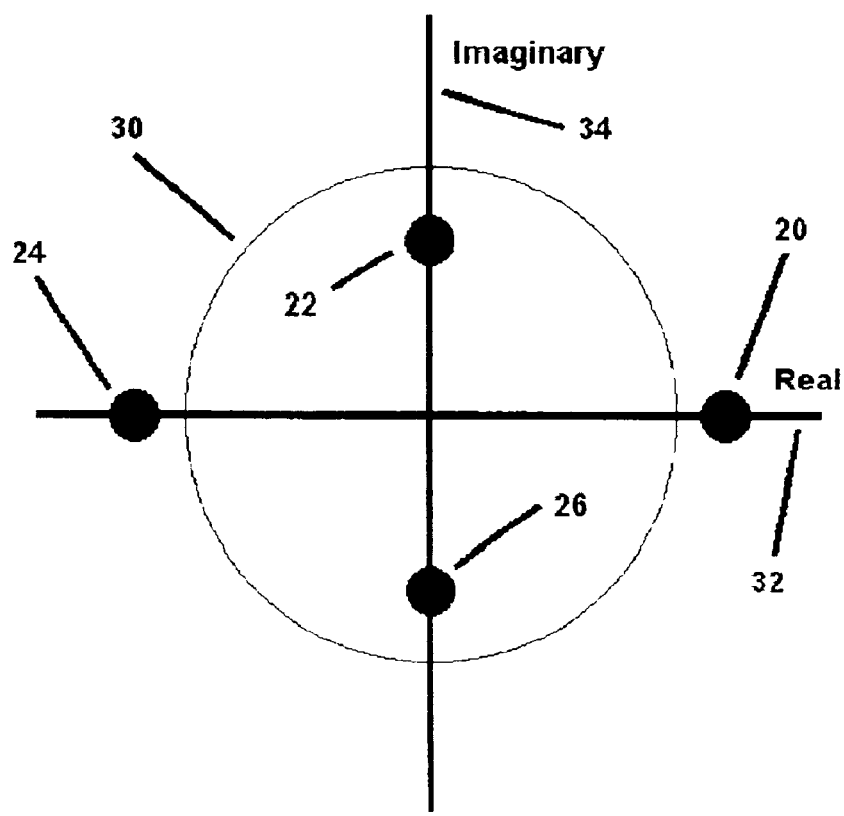
FIG. 1B shows a constellation having four symbols with differing amplitudes and phases.

FIGS. 1A and 1B—Constellations and Statistics

In a typical digital communications system, a sequence of data is mapped to symbols from a constellation. The symbols are complex numbers that a transmitter uses to modulate a signal waveform. After passing through a physical channel to a receiver, the waveform may be distorted. Distortions can include linear inter-symbol interference, independent additive noise, and nonlinearity. The receiver demodulates the received waveform and attempts to undo the distortion to recover the symbols and the data. Channel identification is the process of estimating parameters for a mathematical model of the channel. Equalization is the process of removing distortions using a compensating filter.

One way to enable channel identification and equalization is to transmit known training symbols. However, these reduce the rate at which data can be sent. Semi-blind or blind channel identification and equalization may be possible when there are few or no training symbols transmitted. Such techniques rely on statistical signal processing. A statistic is a number characterizing one or more samples. Input samples are the symbols themselves, while output samples include the channel distortions. Data-bearing symbols are selected randomly, but some of their statistics may have fixed, known values. Statistical signal processing methods rely on measuring output statistics—usually averages of functions of the outputs—and exploiting properties of the channel model and known input statistics.

FIG. 1A shows a constellation with four symbols. This constellation is an example of 4-QAM or 4-PSK. The symbol values are complex numbers each having a real component and an imaginary component. The real component is also known as the in-phase component, while the imaginary component is also known as the quadrature component. A positive real axis 32 and a positive imaginary axis 34 are shown, along with a reference circle of unit amplitude 30. The constellation contains a symbol 1+0j 10, a symbol 0+j 12, a symbol −1+0j 14, and a symbol 0−j 16. All four symbols have unit amplitude, though they have different phases. The constellation is a constant-modulus constellation.

When each symbol has an equal probability of occurrence, this constellation is capable of sending two bits of information per transmitted symbol. The minimum distance between any two symbols is sqrt(2), where sqrt(.) denotes the square root. This makes the constellation robust to the effects of zero-mean additive noise. If greater noise immunity is desired, the amplitude of the symbols can be increased.

Two interesting second-order statistics of this constellation given equal symbol probabilities are the conjugated second moment and the non-conjugated second moment. The conjugated second moment, also known as the average power, is defined as the expectation over all symbols of each symbol multiplied by its complex conjugate. For the constellation of FIG. 1A the conjugated second moment is equal to 1. The non-conjugated second moment is defined as the expectation over all symbols of each symbol multiplied by itself. For the constellation of FIG. 1A, the non-conjugated second moment is equal to 0.

By changing the amplitude of the symbols, it is possible to change the value of the conjugated second moment of the 4-QAM. However, this does not change the non-conjugated second moment.

FIG. 1B shows a second symbol constellation. A positive real axis 32, a positive imaginary axis 34, and a reference circle of unit amplitude 30 are shown for reference. As with the previous constellation, this constellation has four symbols. Two of the symbols have amplitude 1/sqrt(2). One is a symbol 0+1/sqrt(2)j 22 and one is a symbol 0−1/sqrt(2)j 26. Two of the symbols have amplitude sqrt(3/2). One is a symbol sqrt(3/2)+0j 20 and one is a symbol −sqrt(3/2)+0j 24.

Some properties of the constellation in FIG. 1B are the same as those of the constellation in FIG. 1A. Assuming equal probability for each symbol, the constellation in FIG. 1B is able to communicate 2 data bits per transmitted symbol. Also, the minimum symbol separation is sqrt(2). Finally, the average power is equal to 1.

Some properties of this constellation are different from the constellation in FIG. 1A. One is that the constellation no longer has the property of constant-modulus. This is because there are two different symbol amplitudes. Another property is that the non-conjugated second-order moment has a value of ½. For the constellation in FIG. 1A, the non-conjugated second-order moment had a value of 0.

Figure 2A:
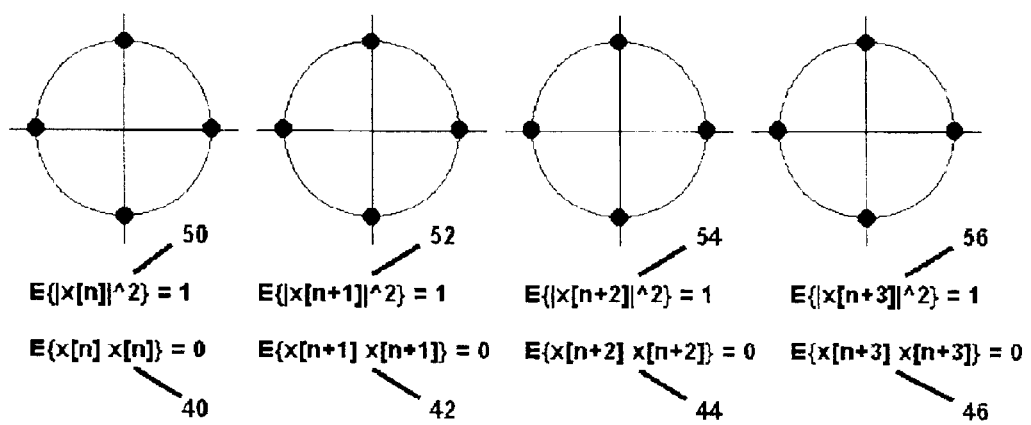
FIG. 2A shows a prior-art sequence of constellations having stationary second-order statistics, and the values of those statistics.
Figure 2B:
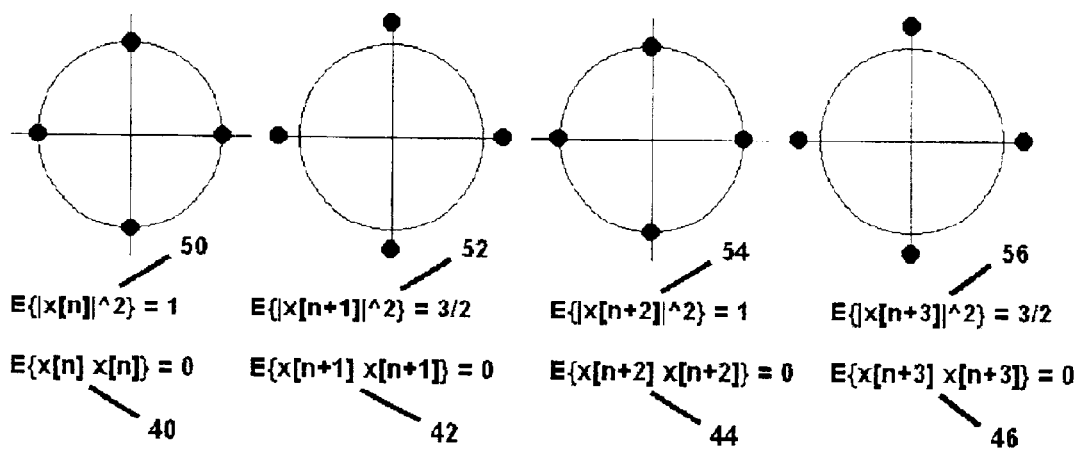
FIG. 2B shows a prior-art sequence of constellations having second-order statistics with a periodically stationary, or cyclostationary, amplitude, and the values of those statistics.

It is possible to change the amplitude of the conjugated second moment and the non-conjugated second moment of the constellation in FIG. 2B by changing the symbol amplitudes. It is also possible to change the phase of the non-conjugated second moment by changing the symbol phases.

The particular symbol values selected for the constellations of FIG. 1A and FIG. 1B and reference circle of unit amplitude 30 serve mainly to illustrate the similarities and differences of the two constellations. The constellations can be scaled in amplitude or rotated to produce different second-order statistics. To have second-order statistics that are stationary, or that are cyclostationary, one must consider sequences of constellations.

FIG. 2A and FIG. 2B—Prior Art Constellation Sequences

FIG. 2A shows a sequence of four symbol constellations used at successive indices n, n+1, n+2, and n+3. At each index, a symbol is selected from the corresponding constellation. Assuming equal probability for each symbol at each index, the figure shows the successive values of the conjugated second moments and the successive values of the non-conjugated second moments. The symbol at index n is denoted by x[n], and the expectation operator is denoted by E {.}.

A conjugated second moment at index n 50, a conjugated second moment at index n+1 52, a conjugated second moment at index n+2 54, and a conjugated second moment at index n+3 56 are all equal to 1. Likewise, a non-conjugated second moment at index n 40, a non-conjugated second moment at index n+1 42, a non-conjugated second moment at index n+2 44, and a non-conjugated second moment at index n+3 46 are all equal to 0.

Assuming that the same pattern is repeated at other indices, FIG. 2A represents a system in which both the conjugated second moment and the non-conjugated second moment are stationary. In such a system, blind channel identification and equalization would have to rely on baud-sampled higher-order statistical approaches for non-minimum phase channels, or on pulse waveforms with extra bandwidth that enable fractional sampling at the receiver. The constellation sequence of FIG. 2A is typical of prior art systems in which symbols are always selected from one constellation.

FIG. 2B shows a second sequence of four symbol constellations. Again assuming equal probabilities for each symbol in the constellation used at each index, the constellations used at index n and at index n+2 are identical, and the constellations used at index n+1 and n+3 are identical. However, the constellations used at index n and at index n+1 are not identical. At index n+1 and at index n+3, the amplitudes of the symbols are all equal to sqrt(3/2). At index n and at index n+2 the symbol amplitudes are all equal to 1.

If the sequence of symbol constellations is repeated at other values of the indices, the sequence of conjugated second moments is periodically stationary, or cyclostationary. A conjugated second moment at index n 50 is 1, a conjugated second moment at index n+1 52 is 3/2, a conjugated second moment at index n+2 54 is 1, and a conjugated second moment at index n+3 56 is 3/2. The statistic has the same value at every other value of n. The period of the cyclostationary conjugated second moments is 2.

A non-conjugated second moment at index n 40, a non-conjugated second moment at index n+1 42, a non-conjugated second moment at index n+2 44, and a non-conjugated second moment at index n+3 46 are all equal to 0. The sequence of non-conjugated second moments is not cyclostationary. Instead, it is stationary.

FIG. 2B illustrates a prior-art enabling technique for blind channel identification and equalization using cyclostationary statistics that vary in amplitude. This transmitter-induced cyclostationarity is produced by varying the average power of the transmitted symbols in a periodic fashion (see the papers by Serpedin and Giannakis 1998, Giannakis 1997, Tsatsanis and Giannakis 1997). In this particular figure, each constellation at any given index has the property of constant modulus, but over all indices there are two different symbol amplitudes.

Figure 2C:
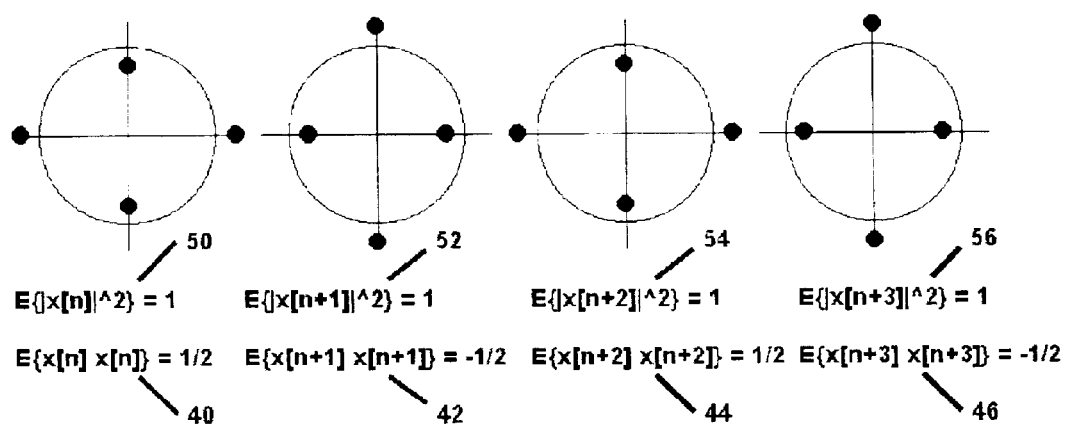
FIG. 2C shows a sequence of constellations having second-order statistics with a periodically stationary, or cyclostationary, phase, and the values of those statistics.

FIG. 2C—Preferred Embodiment

FIG. 2C shows a third sequence of symbol constellations which is a preferred embodiment of the present invention. The sequence consists of a first constellation and a second constellation, with means for periodically selection symbols from each. The means for selecting symbols, which is not shown explicitly in the figure, can be a map between data values and the symbols, with the map changed according to the desired constellation at each index value. In the figure, the first constellation is used at index n and at index n+2, while the second constellation is used at index n+1 and at index n+3.

The first constellation has at least two symbols with non-zero probabilities and differing amplitudes, as shown in the figure. The first constellation is not a constant-modulus constellation. The first constellation has a first second-order statistic equal to the expected value over all symbols in the constellation of each symbol multiplied by its complex conjugate. This statistic is the conjugated second moment, which in the figure is shown having a value of 1.

The first constellation also has a second second-order statistic which is equal to the expected value over all symbols in the constellation of each symbol multiplied by itself. This statistic is the non-conjugated second moment, which is required to be non-zero. In the figure it is shown having a value of ½.

The conjugated second moment and the non-conjugated second moment of the first constellation in the preferred embodiment are normalized values that assume unit average transmitted power and equal symbol probability. This is useful for comparison to the prior art sequences of FIGS. 2A and 2B.

The second constellation has a third second-order statistic which is the conjugated second moment, and which is shown as having a value of 1. The second constellation has a fourth second-order statistic which is the non-conjugated second moment, and which is shown as having a value of −½. The second second-order statistic of the first constellation is not equal to the fourth second-order statistic of the second constellation.

In contrast to the sequence of fixed constellations of FIG. 2A and the sequence of scaled constellations in FIG. 2B, the sequence in FIG. 2C uses rotated versions of the constellation of FIG. 1B. The first constellation is identical to the constellation of FIG. 1B. The second constellation is a rotation by the first constellation of 90 degrees.

For the sequence of FIG. 2C, a conjugated second moment at index n 50, a conjugated second moment at index n+1 52, a conjugated second moment at index n+2 54, and a conjugated second moment at index n+3 56 are all equal to 1. Assuming that the pattern is repeated at other index values, the sequence of conjugated second moments is stationary, so the average transmitted power is stationary.

For the sequence of FIG. 2C, a non-conjugated second moment at index n 40 is ½, a non-conjugated second moment at index n+1 42 is −½, a non-conjugated second moment at index n+2 44 is ½, and a non-conjugated second moment at index n+3 46 is ½. Assuming the pattern is repeated at other index values, the non-conjugated second moments form a cyclostationary sequence with period 2.

The preferred embodiment of FIG. 2C shows periodic selection of symbols from a first constellation and a second constellation having the properties required in the claims. The key features of the preferred embodiment are that the non-conjugated second moment sequence is cyclostationary and that at least one of the constellations does not have the property of constant modulus.

FIG. 2C—Dependent Claims

The preferred embodiment of FIG. 2C can be used to enable blind channel identification and equalization. There are many blind channel identification and equalization techniques. Blind channel identification techniques produce estimates of channel parameters. These parameters can then be used for equalization. Blind equalization techniques produce estimates of parameters for equalizing filters, such as linear feed-forward equalizers, decision-feedback equalizers, and maximum-likelihood sequence estimators.

When used in a system that identifies linear channel parameters using the non-conjugated moments, the preferred embodiment is an example of the second method claim, and the sixth method claim. The sixth method claim require that the first second-order statistic of the first constellation and the third second-order statistic of the second constellation are equal, which is the case in the preferred embodiment of FIG. 2C.

When used in a system that identifies parameters of a linear channel equalizer using the non-conjugated second moments, the preferred embodiment is an example of the third method claim and the seventh method claim. The seventh method claim requires that the first second-order statistic of the first constellation and the third second-order statistic of the second constellation are equal.

When used in a system that identifies nonlinear channel parameters using the non-conjugated second moments, the preferred embodiment is an example of the fourth method claim and the eighth method claim. The eighth method claim requires that the first second-order statistic of the first constellation and the third second-order statistic of the second constellation are equal.

When used in a system that identifies parameters of a nonlinear channel equalizer using the non-conjugated second moments, the preferred embodiment is an example of the fifth method claim and the ninth method claim. The ninth method claim requires that the first second-order statistic of the first constellation and the third second-order statistic of the second constellation are equal.

FIG. 2C—Alternative Embodiments

There are many alternative embodiments of the preferred embodiment of FIG. 2C.

As an alternative embodiment, it is possible to use constellations that are neither rotated versions of each other nor scaled versions of each other. For instance, one might alternate the constellation of FIG. 1A with the constellation of FIG. 1B. It is possible to use constellations with differing numbers of symbols, symbol locations, symbol probabilities, and minimum symbol separation.

As an alternative embodiment, it is possible to have a cyclostationary period of the non-conjugated second moments that is greater than 2. This can be accomplished with periodic selection of symbols from more than two constellations. It can also be accomplished by periodic selection of symbols from two constellations.

As an alternative embodiment, it is possible to have a cyclostationary conjugated second moment sequence, with a period that may or may not be the same as the period of the cyclostationary non-conjugated second moment sequence.

As an alternative embodiment it is possible to have a non-conjugated second moment sequence that is cyclostationary in amplitude or that is cyclostationary in both amplitude and phase. It is possible that the period of the cyclostationary amplitude is not the same as the period of the cyclostationary phase.

With respect to use of the invention in systems for channel identification and equalization, the claims require use of the non-conjugated second moment sequence. It is possible to use the phase of the moments in this sequence, the amplitude of moments in this sequence, or both the amplitude and phase of moments in this sequence. It is also possible to use both the non-conjugated second moment sequence and the conjugated second moment sequence for channel identification and equalization.

FIG. 2C—Summary and Prior Art

For four-point constellations with a given maximum average transmitted power that can communicate two bits per transmitted symbol, the preferred embodiment of FIG. 2C appears to give the best cyclostationary properties of the non-conjugated second moment values.

Subject to a constraint on average transmitted power, the symbols have maximum symbol separation. Also, the sequence appears to have the largest separation between the values of the non-conjugated second moments. The difference between the ½ value and the −½ value is 1. A large difference is important because the receiver in a communications system must compute statistics of measured channel outputs, and a large difference reduces the effects of estimate errors.

The closest prior art to the invention appears in the paper "Blind Channel Identification and Equalization with Modulation-Induced Cyclostationarity" by E. Serpedin and G. Giannakis, which was published in the July 1998 issue of IEEE Transactions on Signal Processing. The paper is principally concerned with transmitter-induced cyclostationarity typified by FIG. 2B, in which the conjugated second-order moment sequence has cyclostationary amplitude.

The authors of the paper propose that a two-symbol constellation, BPSK, could be used in a similar fashion to the preferred embodiment of FIG. 2C. In their proposal, the non-conjugated second-order moment sequence would be cyclostationary and the conjugated second-order moment sequence would be stationary. However, the authors immediately point out that no other common constant-modulus constellations, for instance M-point PSK, have non-conjugated second moments that are not equal to zero. They do not consider other constant-modulus constellations or constellations that are not constant modulus, even though it is possible to design many such constellations with nonzero non-conjugated second moment values. They also do not consider the particular advantages in nonlinear channels of constellations that do not have the property of constant modulus but that can be used to form a sequence with stationary conjugated second moments and cyclostationary non-conjugated second moments.

A second work of prior art that is similar to some of the claims of the present invention is U.S. Pat. No. 4,922,506, issued to R. D. McCallister and D. D. Shearer in 1990. The title of this patent is "Compensating for distortion in a communication channel". Method claim 1 and machine claim 15 of U.S. Pat. No. 4,922,506 are very broad, with the former claiming coverage of "estimating transfer characteristics of a propagation medium from a cyclostationary signal received therefrom" (column 16, lines 19–21). The method includes "generating a plurality of estimator signals only from the received cyclostationary signal, each of which is representative of a discrete portion of a correlation of said received signal" (column 16, lines 23–25).

U.S. Pat. No. 4,922,506 purports to cover "those spread and unspread signals which are included or encompassed by the term cyclostationery [sic] signals" (column 2, lines 17–18). The invention of U.S. Pat. No. 4,922,506 "is predicated upon a Fourier transform relationship between a correlation of the output of medium 18 and the transfer function of medium 18" (column 4, lines 58–61) which is given in corrected form on page 1 of 7 of the appended Certificate of Correction of the patent. This is essentially the same as equation (2-2-28) on page 70 of "Digital Communications" by J. G. Proakis (third edition, McGraw-Hill, 1995). In the same book the autocorrelation of a complex-valued stochastic process is defined in equation (2-2-12) on page 66. For a discrete stochastic signal, the autocorrelation is defined by equation (2-2-40) on page 74 and the Fourier transform relationship of a linear system input and output by equation (2-2-50) on page 75. Pages 75–77 contain a discussion of cyclostationary signals.

The authors of U.S. Pat. No. 4,922,506 make no mention of non-conjugated statistics nor of the distinction between non-conjugated statistics and conjugated statistics. As has been shown in the present invention, non-conjugated and conjugated second-order statistics can have different properties which may or may not be useful for blind channel identification and equalization. The authors of U.S. Pat. No. 4,922,506 also do not mention the possibility of nonlinear channels. Their discussion relates entirely to linear channels for which there is a Fourier transform relationship between inputs and outputs.

Figure 3A:
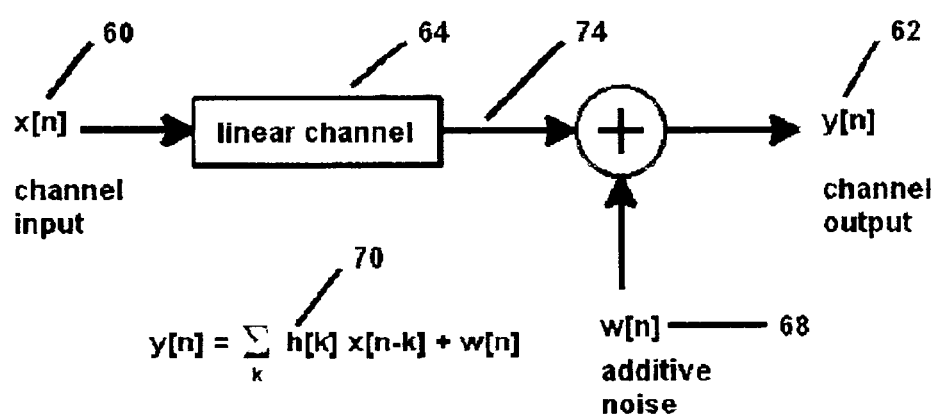
FIG. 3A shows a linear channel model consisting of linear inter-symbol inter-symbol interference followed by additive noise.

FIG. 3A—Linear Channel Models

The preferred embodiment of the present invention shows that sequences of constellations that are not constant modulus that can provide the properties of stationary conjugated second moments and cyclostationary non-conjugated second moments. This means that blind channel identification and equalization techniques using cyclostationary non-conjugated second moments do not have to be restricted to systems with BPSK constellations. This holds true for linear channels, and also for some types of nonlinear channels as well.

FIG. 3A shows a typical linear channel model. A channel input x[n] 60 is passed into the channel at index n. It is first subject to linear inter-symbol interference by a linear channel component 64, resulting in a first intermediate term 74. Each first intermediate term 74 is a linear combination of the transmitted symbols at various indices n. The weight of each channel input 60 in the linear combination is determined by a linear channel coefficient h[k] 70 indexed by k. A noise component w[n] 68 is added to first intermediate term 74 to produce a channel output y[n] 62.

There is one output per transmitted symbol, so the receiver is operating at the baud rate. Blind and semi-blind channel identification and equalization techniques rely on having each linear channel coefficient h[k] 70 change very slowly, so that over a period of time during which channel output statistics are measured, each linear channel coefficient h[k] 70 is approximately constant.

Many existing blind, semi-blind, and training-based channel identification and equalization techniques can be applied to the linear channel model of FIG. 3A. The preferred embodiment of the present invention and alternative embodiments of the present invention can also be applied to the linear channel model of FIG. 3A. Algorithms for statistic matching, mean-squared error minimization, and zero-forcing are candidate techniques. They can operate in batch mode or they can be adaptive. Also, existing algorithms for cyclostationary conjugated second moment sequences can be modified for use with cyclostationary non-conjugated second moment sequences.

Assuming that issues such as synchronization and selection of an appropriate period for the cyclostationary statistics are resolved, given a minimum symbol separation and two data bits to be transmitted per symbol, both the constellation sequence of FIG. 2B and the constellation sequence of FIG. 2C may be used to identify and equalize the channel of FIG. 3A. However, the average power required by the constellation sequence in FIG. 2B is greater than the average power of the constellation sequence in FIG. 2C. If the amplification that enables the cyclostationary conjugated second-order moments in FIG. 2B is reduced to reduce the average power, the separation of the cyclostationary conjugated second-order moments is reduced, and the identification and equalization process becomes sensitive to errors in the statistics estimated from measured channel outputs.

Figure 3B:
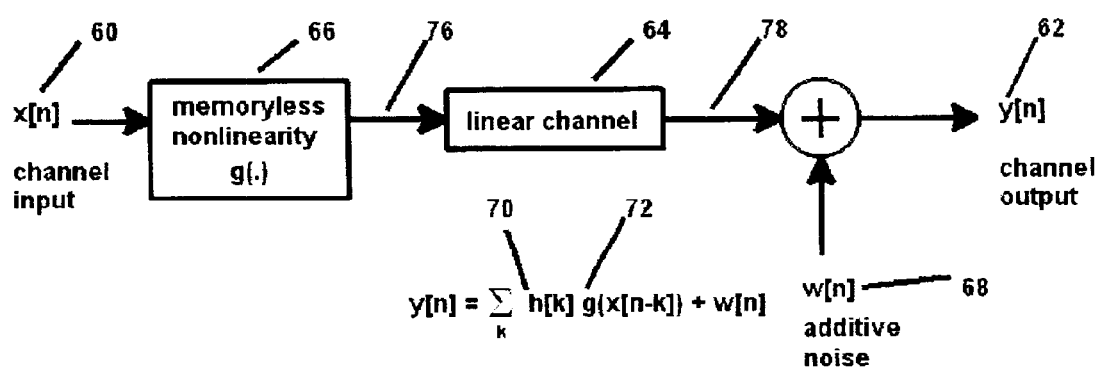
FIG. 3B shows a nonlinear channel model consisting of a zero-memory nonlinearity followed by linear inter-symbol interference and additive noise.

FIG. 3B—Nonlinear Channel Models

FIG. 3B shows a nonlinear channel that models a transmitter with a nonlinear power amplifier followed by a linear channel. A channel input x[n] 60 is passed through a memoryless nonlinear channel component 66, which has a nonlinear channel transfer function g(.) 72. The transfer function produces an output amplitude that depends on input amplitude and produces an output phase that depends on input phase and on input amplitude. It is memoryless because the effect of the nonlinearity on channel input x[n] 60 at index n only depends on that input.

Two examples of actual nonlinear components that are well-modeled by a memoryless nonlinear channel component are traveling wave tube amplifiers and high-power solid state amplifiers.

A traveling wave tube amplifier is a device that is often used in communications satellites because it has a high conversion efficiency. Conversion efficiency relates the amount of useful transmitted power relative to the power that is dissipated as heat during operation. A difficulty with traveling wave tube amplifiers is that they distort both the amplitude and the phase of inputs, particularly at high input levels. Typical solutions to the problems caused by nonlinear traveling wave tube amplifiers include back-off to small input levels and use of constant-modulus constellations. All the symbols of a constant-modulus constellation have the same amplitude, so the traveling wave tube amplifier imparts the same amplitude and phase distortions to every symbol.

A high-power solid state amplifier can also have a nonlinear transfer function. Solid state circuits operate from a power supply having an upper voltage level and a lower voltage level. At signal levels midway between the upper and lower voltage levels, a good solid state amplifier has a highly linear gain. At signal levels near the upper voltage level or near the lower voltage level, the signal tends to saturate, and the gain becomes nonlinear. As with a traveling wave tube amplifier, the nonlinear distortion is memoryless and often reduced or eliminated using back-off or constant-modulus constellations.

The output of memoryless nonlinear channel component 66 is a second intermediate term 76 which is the input to a linear channel component 64. This results in a third intermediate term 78 which is a linear combination of second intermediate terms. Each weight in the linear combination is determined by a linear channel coefficient h[k] 70. A noise component w[n] 68, is added to each third intermediate term 78 to produce a channel output y[n] 62.

Blind channel identification and equalization rely on having channel input statistics that are known at both the transmitter and the receiver. Possible effects of memoryless nonlinear channel component 66 are changes in the amplitude and in the phase of the input symbols. Consequently, the statistics of the input symbols are changed.

In FIG. 2B, the cyclostationary conjugated second moments were obtained by changing the transmitted power of the constellation in a periodic fashion. The effect of memoryless nonlinear channel component 66 on such a sequence of constellations is to change the amplitude and maybe the phase of the statistics. The non-conjugated second moments are all equal to zero, and remain equal to zero after passing through the nonlinearity, assuming the nonlinearity does not introduce a complex offset. The conjugated second moments do not depend on phase, but their amplitudes are changed in a nonlinear fashion. Since the amplitudes of the cyclostationary conjugated second moments of FIG. 2B are what enable the baud-sampled blind channel identification and equalization, the memoryless nonlinear channel component may lead to the need for high-complexity processing.

In the preferred embodiment of FIG. 2C, the sequence of conjugated second moments is stationary. The sequence of non-conjugated second moments is cyclostationary, but with the same amplitude for each non-conjugated second moment. On passing through memoryless nonlinear component 66 in FIG. 3B, the amplitudes and maybe the phases of the transmitted symbols change, and so the amplitudes and maybe the phases of the second-order statistics change. The conjugated second moments are stationary, so the effect of the nonlinearity is a common change in the amplitude of the conjugated second moments. The amplitudes of the non-conjugated second moments are stationary, so the effect of the nonlinearity on the amplitude of the non-conjugated second moment is a common change in amplitude. Since the two different constellations are rotated versions of each other, if there is any phase nonlinearity, it results in a common phase change of the non-conjugated second moments.

Another way to think about this is to view memoryless nonlinear channel component 66 as changing the constellation passed to linear channel component 64. In FIG. 2C, there are two constellations each of which is a rotation of the other. Because the nonlinearity is a function of input amplitude, the sequence of FIG. 2C will become a sequence of distorted constellations. There will be two distorted constellations, each of which is a rotation of the other. As long as the nonlinearity does not reduce the non-conjugated second moments to zero, the relative phase of the sequence of non-conjugated second moments passes through the nonlinearity intact.

The preservation of the relative phase of the non-conjugated second moments enables a low-complexity method of blind channel identification and equalization. First, using the relative phase of the channel output statistics, the receiver can identify the relative amplitude and phase of each linear channel coefficient h[k] 70. Then, an equalizing filter operating on the channel output y[n] 62 sequence, can remove the distortion caused by linear channel component 64. This produces a sequence that matches the second intermediate term 76 sequence to within a constant amplitude and phase. Next, the receiver can try to model nonlinear channel transfer function g(.) 72 using knowledge of the input statistics, the memoryless nature of the nonlinearity, and measured statistics of the filtered output sequence. If the memoryless nonlinear channel component 66 has a one-to-one mapping between input and output, the receiver can determine an inverting nonlinearity which enables it to recover estimates of each channel input x[n] 60 for various n.

CONCLUSION, RAMIFICATIONS, AND SCOPE

The reader will see that the present invention has several advantages over prior art techniques that enable blind or semi-blind channel identification and equalization. The invention extends cyclostationary techniques using second-order statistics to non-conjugated second moments for symbol constellations other than BPSK. The symbol constellations can have more than two symbols and do not have to have the property of constant modulus. The symbol constellations can be rotated versions of each other, but do not have to be. With the preferred embodiment shown in FIG. 2C, the transmitted power—which is the same as the sequence of conjugated second moments—is constant, while the non-conjugated second moment sequence is cyclostationary with period 2.

Alternative embodiments of the invention can have cyclostationary periods of 3 or more. Alternative embodiments can have cyclostationary conjugated second moment sequences that are non-stationary, or that are cyclostationary with a period that is the same as that of the cyclostationary non-conjugated second moment sequence, or that are cyclostationary with a period that is different from that of the cyclostationary non-conjugated second moment sequence. Alternative embodiments can use a mixture of constellations having the property of constant modulus and constellations not having the property of constant modulus.

The preferred embodiment and alternative embodiments of the invention enable blind channel identification and equalization of linear channels. They may be able to accomplish this without requiring additional resources such as extra transmitted power, extra transmitted bandwidth, or both. The preferred embodiment and alternative embodiments of the invention enable low-complexity blind channel identification and equalization of linear channels.

The preferred embodiment and alternative embodiments of the invention enable blind channel identification and equalization of nonlinear channels. They may be able to accomplish this without requiring additional resources such as extra transmitted power, extra bandwidth, or both. The preferred embodiment has constant transmitted power and cyclostationary non-conjugated second moments with constant amplitude, enabling low-complexity blind channel identification and equalization of nonlinear channels.

For linear and for nonlinear channels, the preferred embodiment and alternative embodiments enable identification of channel parameters and identification of parameters for equalizing filters. The parameters can be used to improve the performance of existing digital communications systems or to design new digital communications systems.

The description above contains many specific details relating to symbol values, symbol amplitudes, numbers of symbols, symbol probabilities, constellation statistics, cyclostationary period, cyclostationary statistic values, linear channel models, and nonlinear channel models. These should not be construed as limiting the scope of the invention, but as illustrating some of the presently preferred embodiments of the invention. The scope of the invention should be determined by the appended claims and their legal equivalents, rather than by the examples given.

I claim:

1. A method used for digital communications, comprising:
   a. periodic selection of a symbol from a first symbol constellation having at least two symbols, said two symbols having different amplitudes and each having non-zero probability, and said first symbol constellation having a first second-order statistic and a second second-order statistic, where
      i. said first second-order statistic is the expected value over all symbols in said first symbol constellation of each symbol multiplied by its complex conjugate and
      ii. said second second-order statistic is the expected value over all symbols in said first symbol constellation of each symbol multiplied by itself
   b. periodic selection of a symbol from a second symbol constellation having a third second-order statistic and a fourth second-order statistic, where
      i. said third second-order statistic is the expected value over all symbols in said second symbol constellation of each symbol multiplied by its complex conjugate and
      ii. said fourth second-order statistic is the expected value over all symbols in said second symbol constellation of each symbol multiplied by itself and
      iii. said fourth second-order statistic is not equal to said second second-order statistic.

2. The method of claim 1 further including estimation of parameters of a linear channel using said second second-order statistic of claim 1 and said fourth second-order statistic of claim 1.

3. The method of claim 1 further including estimation of parameters of a linear channel equalizer using said second second-order statistic of claim 1 and said fourth second-order statistic of claim 1.

4. The method of claim 1 further including estimation of parameters of a nonlinear channel using said second second-order statistic of claim 1 and said fourth second-order statistic of claim 1.

5. The method of claim 1 further including estimation of parameters of a nonlinear channel equalizer using said second second-order statistic of claim 1 and said fourth second-order statistic of claim 1.

6. The method of claim 1 wherein said first second-order statistic of claim 1 is equal to said third second-order statistic of claim 1, further including estimation of parameters of a linear channel using said second second-order statistic of claim 1 and said fourth second-order statistic of claim 1.

7. The method of claim 1 wherein said first second-order statistic of claim 1 is equal to said third second-order statistic of claim 1, further including estimation of parameters of a linear channel equalizer using said second second-order statistic of claim 1 and said fourth second-order statistic of claim 1.

8. The method of claim 1, wherein said first second-order statistic of claim 1 is equal to said third second-order statistic of claim 1, further including estimation of parameters of a nonlinear channel using said second second-order statistic of claim 1 and said fourth second-order statistic of claim 1.

9. The method of claim 1 wherein said first second-order statistic of claim 1 is equal to said third second-order statistic of claim 1, further including estimation of parameters of a nonlinear channel equalizer using said second second-order statistic of claim 1 and said fourth second-order statistic of claim 1.

* * * * *